(12) United States Patent
Moore et al.

(10) Patent No.: US 9,073,374 B1
(45) Date of Patent: Jul. 7, 2015

(54) SYSTEM FOR DETECTING INOPERATIVE INKJETS IN THREE-DIMENSIONAL OBJECT PRINTING USING A TEST PATTERN AND ELECTRICAL CONTINUITY PROBES

(71) Applicant: Xerox Corporation, Norwalk, CT (US)

(72) Inventors: Aaron M. Moore, Fairport, NY (US);
Carlos M. Terrero, Ontario, NY (US);
Roberto A. Irizarry, Rochester, NY (US); Timothy G. Shelhart, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,390

(22) Filed: Mar. 31, 2014

(51) Int. Cl.
*B41J 2/135* (2006.01)
*B41J 29/393* (2006.01)
*B33Y 30/00* (2015.01)

(52) U.S. Cl.
CPC ............... *B41J 29/393* (2013.01); *B33Y 30/00* (2014.12)

(58) Field of Classification Search
CPC .................................................. B41J 2/16579
USPC .................................................... 347/19, 44
See application file for complete search history.

(56) References Cited

U.S. PATENT DOCUMENTS

| 8,870,334 | B2 * | 10/2014 | Nakamaki ........................ 347/19 |
| 2004/0012112 | A1 | 1/2004 | Davidson et al. |
| 2006/0111807 | A1 | 5/2006 | Gothait et al. |
| 2006/0141145 | A1 | 6/2006 | Davidson et al. |
| 2009/0011066 | A1 | 1/2009 | Davidson et al. |
| 2010/0151136 | A1 | 6/2010 | Davidson et al. |
| 2010/0184244 | A1 * | 7/2010 | Hunt ............................... 438/57 |

FOREIGN PATENT DOCUMENTS

WO 03/026876 A2 4/2003

* cited by examiner

*Primary Examiner* — Jason Uhlenhake
(74) *Attorney, Agent, or Firm* — Maginot Moore & Beck LLP

(57) ABSTRACT

A printer detects inoperative inkjets during printing of three dimensional objects. The printer includes an electrically conductive substrate onto which a printhead ejects building material in a test pattern. A plurality of electrically conductive members arranged in a pattern corresponding to the test pattern are moved a predetermined distance towards the substrate so ends of the members either contact the surface of the substrate or the building material on the substrate. An electrical current source coupled to the substrate produces a current in those members contacting the substrate. Thus, the inkjets corresponding to the members in which an electrical current is produced are identified as inoperative and the printing of an object can be suspended to take remedial action with regard to the printhead.

13 Claims, 6 Drawing Sheets

SYSTEM FOR DETECTING INOPERATIVE INKJETS IN THREE-DIMENSIONAL OBJECT PRINTING USING A TEST PATTERN AND ELECTRICAL CONTINUITY PROBES

TECHNICAL FIELD

The device disclosed in this document relates to printers that produce three-dimensional objects and, more particularly, to accurate detection of inoperative inkjets in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three dimensional object with these printers can require hours or, with some objects, even days. One issue that arises in the production of three dimensional objects with a three dimensional printer is consistent functionality of the inkjets in the printheads that eject the drops of material that form the objects. During printing of an object, one or more inkjets can deteriorate by ejecting the material at an angle, rather than normal, to the inkjet, ejecting drops that are smaller than an inkjet should eject, or by failing to eject any drop at all. An inkjet suffering from any of these operational deficiencies is known as an inoperative inkjet. If the operational status of one or more inkjets deteriorates during object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. An apparatus that enables detection of inoperative inkjets while printing would enable restorative procedures to be applied during object printing so printing that can produce a properly formed object could continue. In this manner, product yield for the printer is improved and its printing is more efficient. The apparatus should be able to detect inoperative inkjets that eject a multitude of printing materials, such as clear, colored, translucent, phosphorescent, and waxy materials.

SUMMARY

An apparatus that enables inoperative inkjet detection in three dimensional printers includes an electrically conductive substrate having a surface, an electrically conductive member, an electrical current sensor operatively connected to the electrically conductive member, the electrical current sensor being configured to generate an electrical signal in response to electrical current being detected in the electrically conductive member, a first actuator operatively connected to a substrate transport and the electrically conductive member, the actuator being configured to move the electrically conductive substrate between a first position where the electrically conductive substrate is not opposite the electrically conductive member and a second position where the electrically conductive substrate is opposite the electrically conductive member, a second actuator operatively connected to the electrically conductive member, the actuator being configured to move the electrically conductive member towards the electrically conductive substrate when the electrically conductive member is opposite the electrically conductive substrate, and a controller operatively connected to the first actuator and the second actuator, the controller being configured to operate the first actuator to move the electrically conductive substrate between the first position and the second position, to operate the second actuator to move the electrically conductive member a predetermined distance towards the electrically conductive substrate, to receive the signal generated by the electrical current sensor, and to detect inoperative inkjets in a printhead with reference to the signal received from the electrical current sensor and a predetermined pattern used to operate the printhead to eject material onto the electrically conductive substrate.

A printer that incorporates the apparatus for detecting inoperative inkjets includes an electrically conductive substrate having a surface, a printhead configured to eject non-conductive ink through inkjets in the printhead onto the surface of the electrically conductive substrate, an electrically conductive member, an electrical current sensor operatively connected to the electrically conductive member, the electrical current sensor being configured to generate an electrical signal in response to electrical current being detected in the electrically conductive member, a substrate transport configured to move the electrically conductive substrate between a first position opposite the printhead and a second position opposite the electrically conductive member, an actuator operatively connected to the electrically conductive member, the actuator being configured to move the electrically conductive member towards the electrically conductive substrate when the electrically conductive substrate is in the second position, and a controller operatively connected to the printhead, the substrate transport, and the actuator, the controller being configured to operate the printhead to eject ink onto the surface of the electrically conductive substrate with reference to a predetermined pattern, to operate the substrate transport selectively, to operate the actuator to move the electrically conductive member a predetermined distance towards the electrically conductive substrate, to receive the signal generated by the electrical current sensor, and to detect inoperative inkjets in the printhead with reference to the signal received from the electrical current sensor and the predetermined pattern.

BRIEF DESCRIPTION OF THE DRAWINGS

The foregoing aspects and other features of an apparatus or printer that detects inoperative inkjets during three dimensional printing are explained in the following description, taken in connection with the accompanying drawings.

DETAILED DESCRIPTION

Figure 1:
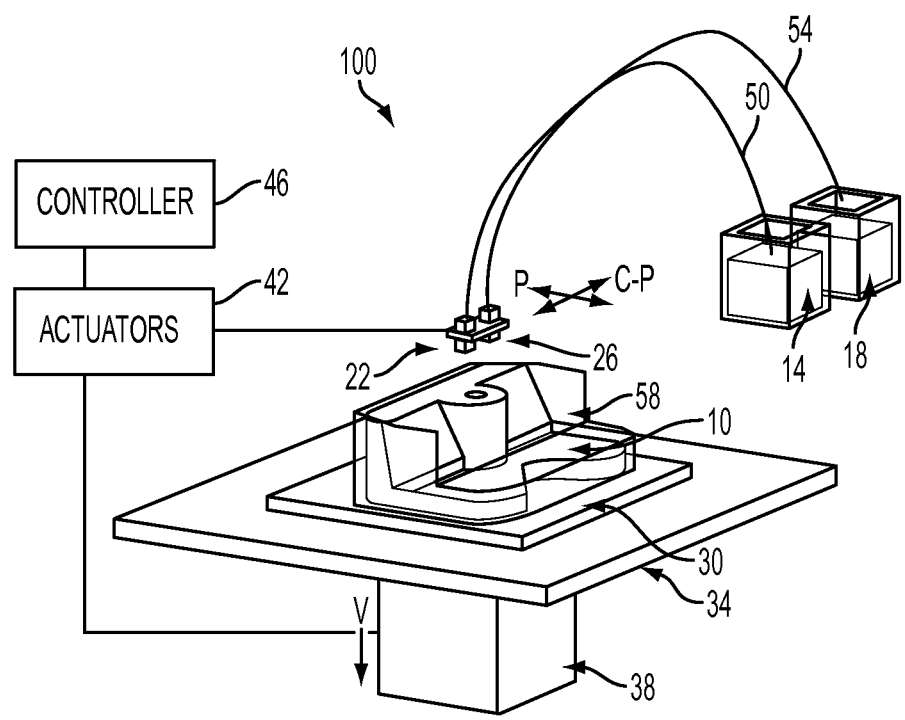
FIG. 1 is a perspective view of a three dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three dimensional printer" refers to any device that ejects material with reference to image data of an object to form a three dimensional object. The printer 100 includes a support material reservoir 14, a building material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both inkjet printheads are operated by the controller 46 with reference to three-dimensional image data in a memory operatively connected to the controller to eject the support and building materials supplied to each respective printhead. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
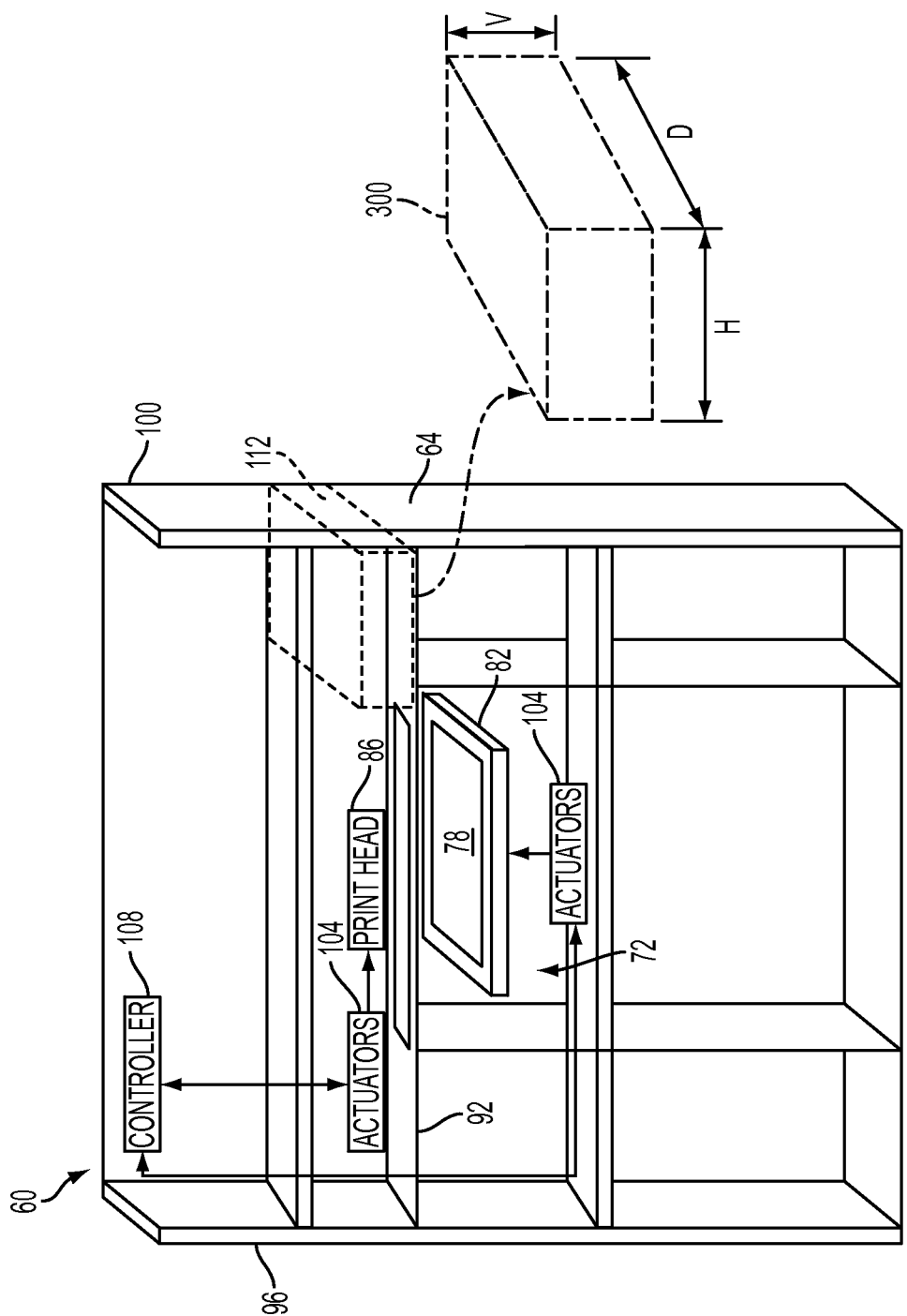
FIG. 2 is front view of a three dimensional object printer having a housing that depicts a space within the housing for a module that enables inoperative inkjets in the printhead to be detected during a printing operation.

A three dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86, vertically moving the support platform 82, and horizontally moving the printhead 86 on the member 92, a three dimensional object can be formed on the planar support 78.

The area 112 outlined in dashes in FIG. 2 identifies the placement of a module that uses electrical continuity checks to detect inoperative inkjets in the printer 60. As noted above, if an inkjet fails during printing of an object by either completely or partially failing to eject material or by errantly ejecting material in a skewed direction, the object being produced is malformed. Currently, this malformation cannot be detected until production of the object is finished. By using area 112 for an electrical continuity checker, printer 60 can be configured to detect inoperative inkjets during object production as described more fully below. Some components within the module 300 can move in the horizontal direction H, depth direction D, and vertical direction V as shown in the figure.

Figure 3:
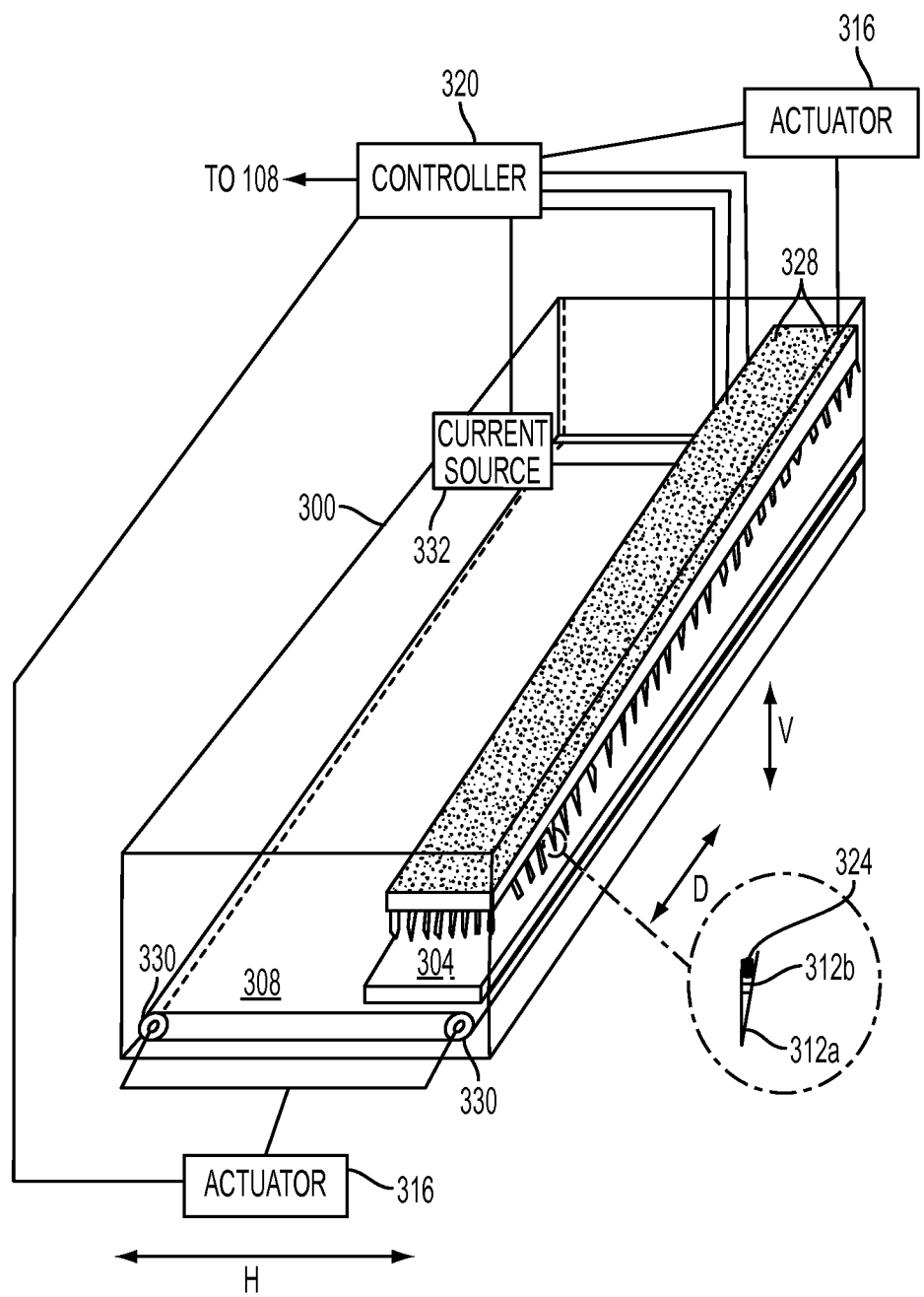
FIG. 3 is a perspective view of a module for detecting inoperative inkjets that fits in the space shown in FIG. 2.
Figure 6:
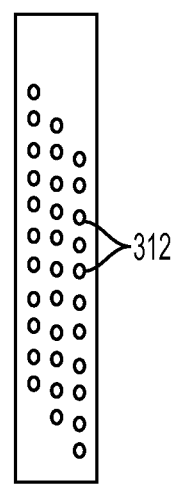
FIG. 6 depicts an arrangement of electrically conductive members that corresponds to an arrangement of inkjets in a printhead.

One embodiment of a module that detects inoperative inkjets during object printing is shown in the block diagram of FIG. 3. The module 300 is configured to fit within area 112 of printer 60. The module 300 includes an electrically conductive substrate 304, a substrate transport 308, a plurality of electrically conductive members 312, one or more actuators 316, a plurality of electrical current sensors 328, and a controller 320. The controller 320 and the actuators 316 are depicted outside of the module 300 for illustration purposes only. In the implementation of the module, the controller 320 is provided on a printed circuit card installed within the module and the actuators are positioned within the module housing as well. The controller 320 is operatively connected to the actuators 316 to move the substrate 304 bidirectionally in the H direction with the transport 308 and to displace the platform from which the electrically conductive members 312 extend in a reciprocating vertical direction V as shown in the figure. The electrically conductive members 312 and electrical current sensors 328 are arranged in an array that corresponds to an arrangement of the inkjets in the printhead to be tested. Such an arrangement is shown in FIG. 6. Each electrically conductive member 312 can be two cylindrical hollow conductors 312a, 312b arranged in a telescoping manner with a biasing member 324 that urges conductor 312a away from conductor 312b. In another embodiment, the electrically conductive members are solid electrical conductors that can be biased with a spring or other biasing member to extend away from the platform in which they are mounted. This biasing provides a tolerance for movement of the conductors relative to one another or the platform in which they are mounted. Each electrically conductive member 312 is operatively connected to a current sensor 328. The controller 320 is operatively connected to the current sensors (only three connections between the sensors 328 and the controller 320 are shown in the figure to simplify the depiction) to detect whether an electrical current is flowing through an electrically conductive member 312.

The substrate 304 is an electrically conductive planar substrate. For example, the electrically conductive planar substrate could be a printed circuit board with a layer of copper on its surface. The substrate transport 308 is shown as an endless belt entrained about rollers 330 that support substrate 304 and enable one of the actuators 316 to drive the rollers 330 to move the substrate 304 in a horizontal direction H in a reciprocating manner between two positions as shown in the figure. One position is opposite the plurality of electrically conductive members 312 as depicted in the figure and the other position is adjacent the current position to enable the substrate 304 to be opposite the printhead 86 when the printhead 86 is moved into the module as explained below. The controller 320 is configured to operatively connect substrate 304 to a current source 332 through operation of a switch or the like. The module 300 is configured as an apparatus that can be installed in and removed from the printer 60 as a unit.

Figure 4:
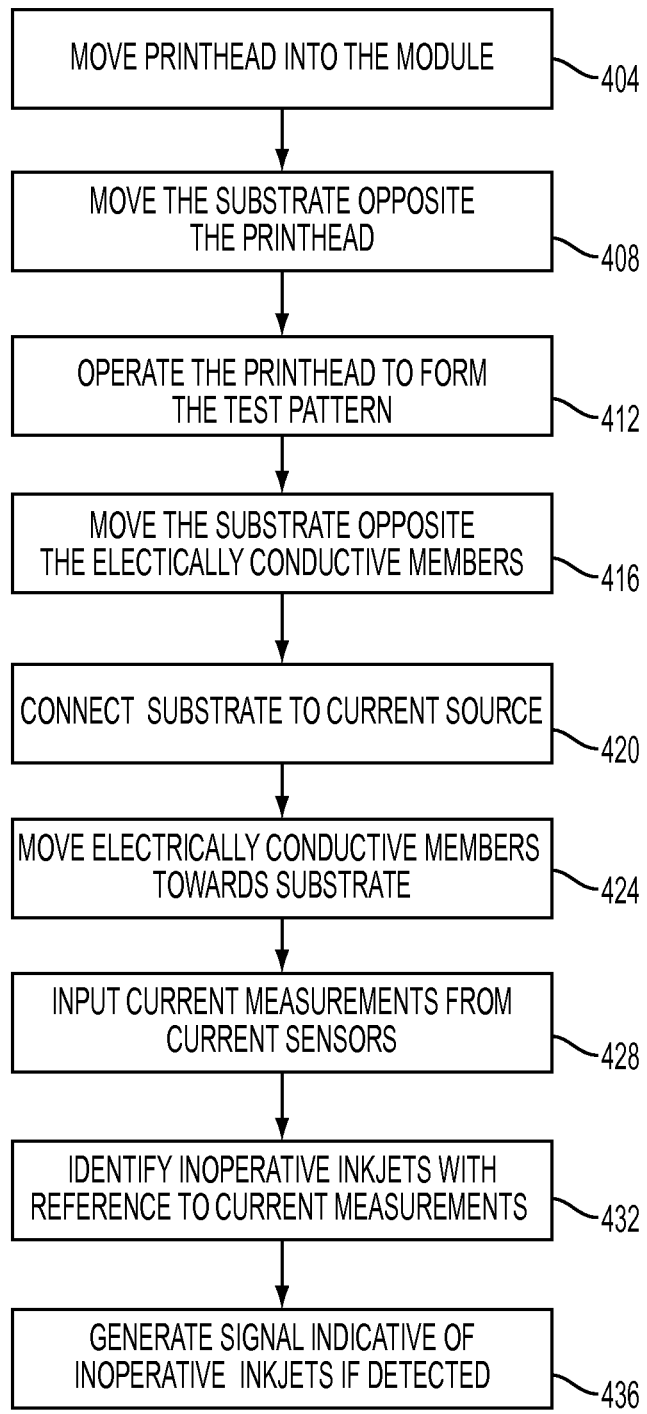
FIG. 4 is a flow diagram of a method for operating the module of FIG. 3.

To detect inoperative inkjets during printing operations, the module 300 is operated with reference to the method 400 shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 320 noted above can be such a controller or processor. Alternatively, the controller 320 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 320 detecting the printhead in the module 300, controller 320 operates an actuator 316 to move the transport 308 and the substrate 304 on the transport to a position opposite the printhead 86 (block 408). Controller 320 then generates a signal to the controller 108 to operate the inkjets in the printhead to print a test pattern (block 412). In one embodiment, each inkjet in the printhead is repetitively operated to form a pile of material on a portion of the substrate 304 opposite the inkjet. After the test pattern is printed, controller 108 generates a signal for controller 320 and, in response to the signal, controller 320 operates an actuator 316 to move the substrate 304 opposite the plurality of electrically conductive members 312 (block 416). The substrate 304 is then connected to the current source 332 (block 420) and an actuator is operated to lower the plurality of electrically conductive members 312 towards the substrate 304 by a predetermined distance (block 424). This distance is sufficient to ensure that each electrically conductive member 312 contacts the substrate 304 if no building material is present on the substrate at the point of contact between an electrically conductive member 312 and the substrate 304. If building or support material is present, the end of the electrically conductive member 312 contacts the building or support material. As noted previously, the biasing action of the electrically conductive member enables the member to compensate for the thickness of the material that prevents the end of the electrically conductive member from reaching the predetermined distance. The controller 320 then detects the current sensors 328 that indicate an electrical current is flowing through an electrically conductive member 312 (block 428). Since the material ejected onto the substrate is not electrically conductive, only those members 312 that contact the substrate 304 have electrical current flowing through them. Thus, the controller 320 identifies inoperative inkjets as those inkjets that correspond to the electrically conductive members 312 that have electrical current flowing through them (block 432) and generates a signal indicative of the defective printhead for the operator of the printer (block 436). The operator can then take appropriate action.

Figure 5:
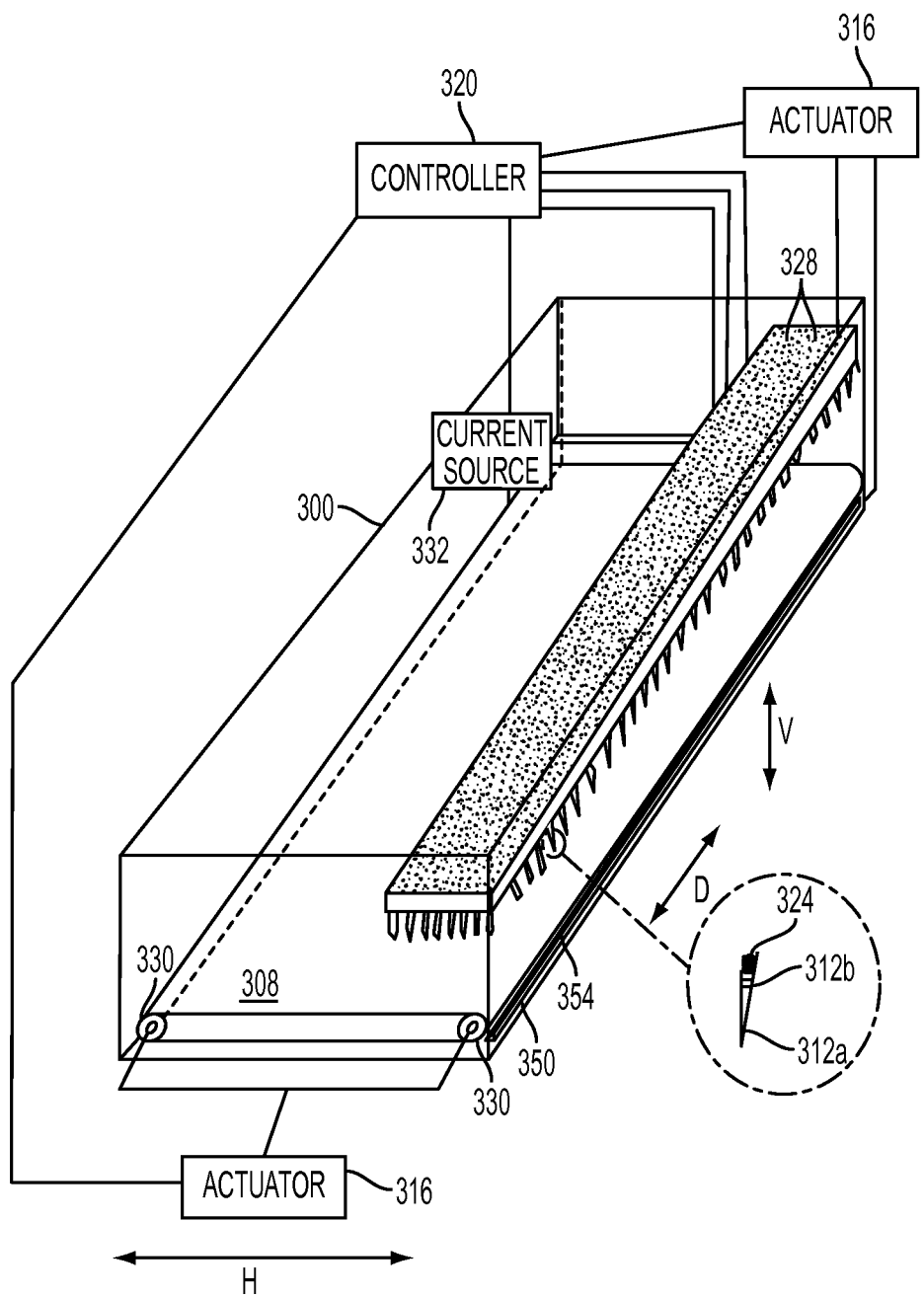
FIG. 5 is an alternative embodiment of a printer having a module for detecting inoperative inkjets during printing of a three dimensional object.

In another embodiment shown in FIG. 5, the endless belt 308 is formed with an electrically conductive material or the belt can have a flexible electrically conductive material formed or attached on the belt. The controller 320 operates an actuator 316 that is operatively connected to the rollers 330 to move a portion of the belt to a position where the printhead 86 can print the test pattern and then reverse the rotation of the rollers to a position where the test pattern is evaluated. There, the electrically conductive members 312 are lowered towards belt 308 to identify inoperative inkjets by detecting current through the members. Once the inoperative inkjets are identified, controller 320 operates an actuator 316 to move a beveled edge 354 of a wiper 350 into contact with the belt 308. The controller then drives roller 330 to rotate the belt portion with the test pattern past the wiper to remove the building material from the substrate and sweep it into a collection receptacle that underlies the wiper. Although the wiper is shown in the figure as being positioned adjacent one of the rollers 330, it can also be positioned on the lower side of the endless belt. The wiper can be configured with a conduit that is fluidly connected to a source of cleaning fluid. During a cleaning operation the cleaning fluid is pressurized to push the fluid through the conduit and onto the substrate to help loosen the building material from the substrate before the wiper sweeps the substrate. The collection receptacle can also be configured for removal from the module so it can be emptied from time to time.

In the embodiments discussed, the electrically conductive substrate is printed with a test pattern. After the inkjets have been tested, the printhead is moved above the planar support 78 and printing of the object continues provided no inoperative inkjets were detected. To prepare for the next inkjet test, the substrate needs to be either cleaned or replaced. In some embodiments, the module 300 is opened, the substrate is removed, and a new substrate is installed in the module. In the embodiment shown in FIG. 5, a wiper is provided to remove the material that forms the test pattern and drop it in a collection receptacle.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A printer for forming objects comprising:
an electrically conductive substrate having a surface;
a printhead configured to eject non-conductive ink through inkjets in the printhead onto the surface of the electrically conductive substrate;
an electrically conductive member;
an electrical current sensor operatively connected to the electrically conductive member, the electrical current sensor being configured to generate an electrical signal in response to electrical current being detected in the electrically conductive member;
a substrate transport configured to move the electrically conductive substrate between a first position opposite the printhead and a second position opposite the electrically conductive member;
an actuator operatively connected to the electrically conductive member, the actuator being configured to move the electrically conductive member towards the electrically conductive substrate when the electrically conductive substrate is in the second position; and
a controller operatively connected to the printhead, the substrate transport, and the actuator, the controller being configured to operate the printhead to eject ink onto the surface of the electrically conductive substrate with reference to a predetermined pattern, to operate the substrate transport selectively, to operate the actuator to move the electrically conductive member a predetermined distance towards the electrically conductive substrate, to receive the signal generated by the electrical current sensor, and to detect inoperative inkjets in the printhead with reference to the signal received from the electrical current sensor and the predetermined pattern.

2. The printer of claim 1 further comprising:
a plurality of electrically conductive members arranged with reference to the predetermined pattern;
a plurality of electrical current sensors operatively connected to the plurality of electrically conductive members in a one-to-one correspondence, each electrical current sensor being configured to generate an electrical signal in response to an electrical current being detected in the electrically conductive member to which the electrical current sensor is operatively connected; and
the controller is operatively connected to each electrical current sensor and the controller is further configured to detect inoperative inkjets with reference to the electrical signals generated by the plurality of electrical current sensors.

3. The printer of claim 2 wherein the predetermined pattern and the arrangement of the plurality of electrically conductive members and the plurality of electrical current sensors correspond to an arrangement of inkjets in the printhead.

4. The printer of claim 2, each electrically conductive member further comprising:
an end that is displaceable with reference to a remaining portion of the electrically conductive member; and
a biasing member configured to urge the end of the electrically conductive member away from the remaining portion.

5. A printer for forming objects comprising:
an electrically conductive substrate having a surface;
a printhead configured to eject non-conductive ink through inkjets in the printhead onto the surface of the electrically conductive substrate;
an electrically conductive member;
an electrical current sensor operatively connected to the electrically conductive member, the electrical current sensor being configured to generate an electrical signal in response to electrical current being detected in the electrically conductive member;
a first actuator operatively connected to the printhead and the electrically conductive member, the actuator being configured to move the printhead and the electrically conductive member between a first position at which the printhead is opposite the surface of the electrically conductive substrate and the electrically conductive member is not opposite the surface of the electrically conductive substrate and a second position at which the printhead is not opposite the surface of the electrically conductive substrate and the electrically conductive member is opposite the surface of the electrically conductive substrate;
a second actuator operatively connected to the electrically conductive member, the actuator being configured to move the electrically conductive member towards the electrically conductive substrate when the electrically conductive member is in the second position; and
a controller operatively connected to the printhead, the first actuator, and the second actuator, the controller being configured to operate the printhead to eject ink onto the surface of the electrically conductive substrate with reference to a predetermined pattern, to operate the first actuator selectively, to operate the second actuator to move the electrically conductive member a predetermined distance towards the electrically conductive substrate, to receive the signal generated by the electrical current sensor, and to detect inoperative inkjets in the printhead with reference to the signal received from the electrical current sensor and the predetermined pattern.

6. The printer of claim 5 further comprising:
a plurality of electrically conductive members arranged with reference to the predetermined pattern;
a plurality of electrical current sensors operatively connected to the plurality of electrically conductive members in a one-to-one correspondence, each electrical current sensor being configured to generate an electrical signal in response to an electrical current being detected in the electrically conductive member to which the electrical current sensor is operatively connected; and
the controller is operatively connected to each electrical current sensor and the controller is further configured to detect inoperative inkjets with reference to the electrical signals generated by the plurality of electrical current sensors.

7. The printer of claim 6 wherein the predetermined pattern and the arrangement of the plurality of electrically conductive members and the plurality of electrical current sensors correspond to an arrangement of inkjets in the printhead.

8. The printer of claim 6, each electrically conductive member further comprising:
an end that is displaceable with reference to a remaining portion of the electrically conductive member; and
a biasing member configured to urge the end of the electrically conductive member away from the remaining portion.

9. An apparatus for installation in a printer that forms three dimensional objects to detect inoperative inkjets comprising:
an electrically conductive substrate having a surface;
an electrically conductive member;
an electrical current sensor operatively connected to the electrically conductive member, the electrical current sensor being configured to generate an electrical signal in response to electrical current being detected in the electrically conductive member;

a first actuator operatively connected to a substrate transport and the electrically conductive member, the actuator being configured to move the electrically conductive substrate between a first position where the electrically conductive substrate is not opposite the electrically conductive member and a second position where the electrically conductive substrate is opposite the electrically conductive member;

a second actuator operatively connected to the electrically conductive member, the actuator being configured to move the electrically conductive member towards the electrically conductive substrate when the electrically conductive member is opposite the electrically conductive substrate; and a controller operatively connected to the first actuator and the second actuator, the controller being configured to operate the first actuator to move the electrically conductive substrate between the first position and the second position, to operate the second actuator to move the electrically conductive member a predetermined distance towards the electrically conductive substrate, to receive the signal generated by the electrical current sensor, and to detect inoperative inkjets in a printhead with reference to the signal received from the electrical current sensor and a predetermined pattern used to operate the printhead to eject material onto the electrically conductive substrate.

10. The apparatus of claim 9 further comprising:

a plurality of electrically conductive members arranged with reference to the predetermined pattern;

a plurality of electrical current sensors operatively connected to the plurality of electrically conductive members in a one-to-one correspondence, each electrical current sensor being configured to generate an electrical signal in response to an electrical current being detected in the electrically conductive member to which the electrical current sensor is operatively connected; and the controller is operatively connected to each electrical current sensor and the controller is further configured to detect inoperative inkjets with reference to the electrical signals generated by the plurality of electrical current sensors.

11. The apparatus of claim 10 wherein the predetermined pattern and the arrangement of the plurality of electrically conductive members and the plurality of electrical current sensors correspond to an arrangement of inkjets in the printhead.

12. The apparatus of claim 10, each electrically conductive member further comprising:

an end that is displaceable with reference to a remaining portion of the electrically conductive member; and a biasing member configured to urge the end of the electrically conductive member away from the remaining portion.

13. The apparatus of claim 10 further comprising:

a wiper positioned proximate electrically conductive member; and the controller is operatively connected to the actuator that is operatively connected to the wiper, the controller being further configured to operate the actuator to engage the electrically conductive member with the wiper while the electrically conductive member is moving to remove the non-conductive ink from the electrically conductive member.

* * * * *